United States Patent
Jung et al.

(10) Patent No.: US 9,539,448 B2
(45) Date of Patent: Jan. 10, 2017

(54) FIRE SUPPRESSION APPARATUS FOR A BATTERY PACK

(71) Applicant: LG Chem, Ltd., Seoul (KR)

(72) Inventors: Seung-Hun Jung, Daejeon (KR); Dong-Seok Shin, Seoul (KR); Young-Joon Shin, Daejeon (KR)

(73) Assignee: LG Chem, Ltd. (KR)

( * ) Notice: Subject to any disclaimer, the term of this patent is extended or adjusted under 35 U.S.C. 154(b) by 236 days.

(21) Appl. No.: 14/198,741

(22) Filed: Mar. 6, 2014

(65) Prior Publication Data

US 2014/0186668 A1   Jul. 3, 2014

Related U.S. Application Data (63) Continuation of application No. PCT/KR2012/007262, filed on Sep. 10, 2012.

(30) Foreign Application Priority Data

Sep. 8, 2011  (KR) .................. 10-2011-0091376
Sep. 10, 2012  (KR) .................. 10-2012-0099794

(51) Int. Cl.
*H01M 10/42* (2006.01)
*H01M 10/48* (2006.01)
(Continued)

(52) U.S. Cl.
CPC . *A62C 3/00* (2013.01); *A62C 3/16* (2013.01); *H01M 10/42* (2013.01);
(Continued)

(58) Field of Classification Search
None
See application file for complete search history.

(56) References Cited

U.S. PATENT DOCUMENTS 8,499,560 B2   8/2013   Gauthier et al.
2001/0055712 A1   12/2001   Cittanova
(Continued)

FOREIGN PATENT DOCUMENTS

JP   S26-5798 A   6/1951
JP   2-61362 A   5/1990
(Continued)

OTHER PUBLICATIONS

International Search Report for PCT/KR2012/007262 mailed Feb. 27, 2013.
(Continued)

*Primary Examiner* — Jonathan Crepeau
(74) *Attorney, Agent, or Firm* — Lerner, David, Littenberg, Krumholz & Mentlik, LLP (57) ABSTRACT

Disclosed is an apparatus capable of suppressing a fire of a battery pack when a fire occurs at the battery pack. The fire suppression apparatus includes a fire detection sensor for detecting the probability of fire occurrence at a battery pack, a fire-extinguishing chemical tank containing a fire-extinguishing chemical in an inner space therein, and a control unit for allowing the fire-extinguishing chemical of the fire-extinguishing chemical tank into the battery pack when fire occurrence is detected by the fire detection sensor.

15 Claims, 4 Drawing Sheets

(51) Int. Cl.
*H01M 10/613* (2014.01)
*H01M 10/63* (2014.01)
*A62C 3/16* (2006.01)
*A62C 3/00* (2006.01)
*H01M 2/12* (2006.01)

(52) U.S. Cl.
CPC ....... *H01M 10/4207* (2013.01); *H01M 10/48* (2013.01); *H01M 10/613* (2015.04); *H01M 10/63* (2015.04); *H01M 2/1223* (2013.01); *H01M 10/486* (2013.01)

(56) References Cited

U.S. PATENT DOCUMENTS

| | | | |
|---|---|---|---|
| 2006/0246345 | A1 | 11/2006 | Yoon et al. |
| 2007/0042248 | A1 | 2/2007 | Kim et al. |
| 2011/0250477 | A1 | 10/2011 | Yoshida et al. |
| 2012/0002338 | A1* | 1/2012 | Smith .................... B60K 28/14 361/116 |

FOREIGN PATENT DOCUMENTS

| | | |
|---|---|---|
| JP | H0631011 A | 2/1994 |
| JP | H10-216265 A | 8/1998 |
| JP | H11-219732 A | 8/1999 |
| JP | 2001-218862 A | 8/2001 |
| JP | 2002-063931 A | 2/2002 |
| JP | 2008-535174 A | 8/2008 |
| JP | 2009074603 A | 4/2009 |
| JP | 2010-097836 A | 4/2010 |
| JP | 2010515507 A | 5/2010 |
| KR | 20-1998-0051830 U | 10/1998 |
| KR | 1998-0051830 U | 10/1998 |
| KR | 10-0641126 B1 | 11/2006 |
| KR | 20070006000 A | 1/2007 |
| KR | 100846103 B1 | 7/2008 |
| KR | 20120069334 A | 6/2012 |
| WO | 2010/073809 A1 | 7/2010 |

OTHER PUBLICATIONS

Supplemental Search Report from European Application No. 12 83 0762, dated Jun. 25, 2015.

* cited by examiner

FIRE SUPPRESSION APPARATUS FOR A BATTERY PACK

CROSS-REFERENCE TO RELATED APPLICATION

The present application is a continuation of International Application No. PCT/KR2012/007262 filed on Sep. 10, 2012, which claims priority to Korean Patent Application No. 10-2011-0091376 filed on Sep. 8, 2011 and Korean Patent Application No. 10-2012-0099794 filed on Sep. 10, 2012 in the Republic of Korea, the disclosures of which are incorporated herein by reference.

TECHNICAL FIELD

The present disclosure relates to a technique for protecting a battery pack, and more particularly, to an apparatus capable of suppressing a fire of a battery pack when a fire occurs at the battery pack.

BACKGROUND ART

Recently, the demand for portable electronic products such as notebooks, video cameras, cellular phones or the like is rapidly increasing, and energy storage batteries, robots, satellites or the like are developed in earnest. Accordingly, a high-performance secondary battery allowing repeated charging/discharging is actively studied.

Secondary batteries commercially used at the present include nickel-cadmium batteries, nickel-hydrogen batteries, nickel-zinc batteries, lithium secondary batteries or the like, among which the lithium secondary batteries are in the limelight due to their very low self-discharge ratio, high energy density and free charging/discharging since a memory effect does not substantially occur in comparison to nickel-based secondary batteries.

Recently, due to exhaustion of carbon energy and increased interest in the environment, hybrid electric vehicles and electric vehicles are becoming the focus of public attention all over the world, including US, Europe, Japan and Korea. For such vehicles, the most important component is a vehicle battery which gives a driving force to a vehicle motor. Since the hybrid electric vehicle or the electric vehicle obtains a driving force by means of charging/discharging of the battery, they ensure better mileage in comparison to a vehicle using only an engine and discharges little to no pollution, which is one of the growing reasons why people choose to use such vehicles.

Meanwhile, one of the most important social issues in relation to batteries is safety. The use of batteries is not only increasing in small-sized devices such as notebooks and cellular phones but also in middle-sized or large-sized devices such as vehicles and power storage systems. Also, since the explosion or fire of a battery may damage a device to which the battery is mounted and can lead to additional conflagration, the safety of the battery is of major concern.

In particular, middle-sized or large-sized batteries used for hybrid electric vehicles or electric vehicles demand even stricter safety requirements. Such middle-sized or large-sized batteries generate high voltage, which in itself cause a lot of heat. Moreover, in cases of a battery for a vehicle, if a battery pack is excessively operated at high temperature during the hot summer time or great impact is applied to the battery due to an accident such as vehicle collision, causing an internal short circuit or a protection function to malfunction, a fire may occur at the battery for a vehicle.

If a fire occurs at the battery for a vehicle as described above, the fire is not limited to damaging just the battery but can spread to the vehicle, which may obviously cause property damage, but also lead to risking the safety of the person in the vehicle. Moreover, on the road, a vehicle fire may spread to other vehicles and cause traffic congestion, which may result in even more serious damage.

DISCLOSURE

Technical Problem

The present disclosure is designed to solve the problems of the related art, and therefore the present disclosure is directed to providing an apparatus for suppressing a fire rapidly when a fire occurs at a battery pack or a fire risk is detected.

Other objects and advantages of the present disclosure will be understood from the following descriptions and become apparent by the embodiments of the present disclosure. In addition, it is understood that the objects and advantages of the present disclosure may be implemented by components defined in the appended claims or their combinations.

Technical Solution

In one aspect of the present disclosure, there is provided a fire suppression apparatus for a battery pack, which includes a fire detection sensor for detecting a probability of fire occurrence at a battery pack; a fire-extinguishing chemical tank containing a fire-extinguishing chemical in an inner space therein; and a control unit for allowing the fire-extinguishing chemical of the fire-extinguishing chemical tank into the battery pack when fire occurrence is detected by the fire detection sensor.

Preferably, the fire-extinguishing chemical tank may include an outlet connected to the inside of the battery pack to discharge the fire-extinguishing chemical, a piston for discharging the fire-extinguishing chemical to the outlet by means of movement, and an explosive for moving the piston by explosion, and when fire occurrence is detected, the control unit may explode the explosive of the fire-extinguishing chemical tank to move the piston so that the fire-extinguishing chemical of the fire-extinguishing chemical tank is injected into the battery pack.

At this time, the fire-extinguishing chemical tank may further include a first outlet valve for opening or closing the outlet.

Advantageous Effects

According to the present disclosure, if a fire occurs at a battery pack, the tire may be suppressed rapidly. In addition, according to an embodiment of the present disclosure, if a battery pack has a fire risk, namely probability of a fire, the fire risk is predicted to prevent the fire from occurring or spreading.

Therefore, according to the present disclosure, a fire of a battery pack may be suppressed at an early stage, which presents the tire from spreading to a device or equipment to which the battery pack is mounted. Therefore, it is possible to prevent or decrease property damage or any casualties caused by a fire of a battery pack.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
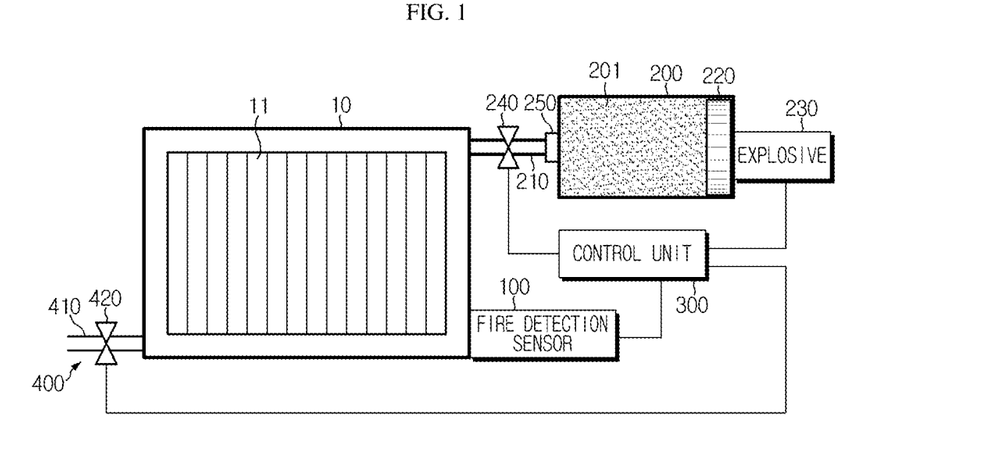
FIG. 1 is a schematic diagram showing a fire suppression apparatus for a battery pack according to an embodiment of the present disclosure.

FIG. 1 is a schematic diagram showing a fire suppression apparatus for a battery pack according to an embodiment of the present disclosure. As shown in FIG. 1, in general, a battery pack 10 may include one or more battery cell 11. In addition, the fire suppression apparatus for a battery pack according to the present disclosure may suppress a fire occurring at the battery pack 10.

Referring to FIG. 1, the fire suppression apparatus for a battery pack according to the present disclosure includes a fire detection sensor 100, a fire-extinguishing chemical tank 200 and a control unit 300.

The fire detection sensor 100 detects probability of fire occurrence at the battery pack 10. Here, the probability of fire occurrence at the battery pack 10 means not only the probability of which a fire actually occurs at the battery pack 10, but also the probability of whether or not a fire is to occur even before a fire occurs at the battery pack 10.

Preferably, the fire detection sensor 100 may be implemented to include at least one of a temperature sensor, an impact sensor and a pressure sensor.

First, if a fire occurs at the battery pack 10, the temperature of the battery pack 10 may increase due to the fire. For this reason, the fire detection sensor 100 may be implemented with a temperature sensor. In this case, the temperature sensor may detect the probability of fire occurrence at the battery pack 10 by determining whether or not a temperature over a certain level is detected at the battery pack 10.

In addition, if great impact is applied to the battery pack 10, a fire may occur at the battery pack 10 due to an internal short circuit or the like. For this reason, the fire detection sensor 100 may be implemented with an impact sensor. In this case, the impact sensor may detect a fire risk of the battery pack 10 by determining whether or not an impact over a certain level is applied to the battery pack 10.

Moreover, if high pressure is applied to the battery pack 10, a fire may also occur at the battery pack 10. For this reason, the fire detection sensor 100 may be implemented with a pressure sensor. In this case, the pressure sensor may be able to detect a fire risk of the battery pack 10 by determining whether or not a pressure over a certain level is applied to the battery pack 10.

At this time, information about a criterion temperature, impact or pressure used when the temperature sensor, the impact sensor or the pressure sensor detects the probability of fire occurrence may be stored in the corresponding fire detection sensor 100 or another storage device in advance.

Meanwhile, even though it is depicted that the fire detection sensor 100 is attached to the battery pack 10, this is merely just an example, and the fire detection sensor 100 is not limited to being attached to the battery pack 10 and may be separated from the battery pack 10.

In addition, the fire detection sensor 100 may be implemented in various ways, without being limited to the temperature sensor, the impact sensor and the pressure sensor. For example, the fire detection sensor 100 may be implemented with a smoke sensor which detects smoke.

The fire-extinguishing chemical tank 200 has a predetermined inner space and possesses a fire-extinguishing chemical 201 in the inner space.

Here, the fire-extinguishing chemical 201 may have any material or shape capable of suppressing a fire, and the present disclosure is not limited to a specific kind or shape of the fire-extinguishing chemical 201. For example, the fire-extinguishing chemical 201 may be a nonflammable or fire retardant solution, such as water or a solution obtained by dissolving a fire-extinguishing medium in water.

In addition, the fire-extinguishing chemical 201 may include two or more substances. In this case, two or more substances may have fire-extinguishing ability independently or exhibit fire-extinguishing ability by means of mutual reaction. For example, the fire-extinguishing chemical 201 may include sodium bicarbonate and aluminum sulfate, which generates bubbles by means of chemical reaction and suppresses fire.

Moreover, various fire-extinguishing substances known in the art at the filing of this application may be used as the fire-extinguishing chemical 201 of the present disclosure. In addition, the fire-extinguishing chemical 201 may be possessed in the fire-extinguishing chemical tank 200 in a liquid, gas or powder state. Further, the fire-extinguishing chemical 201 may be injected into the battery pack 10 in a liquid, gas or powder state.

If fire occurrence is detected by the fire detection sensor 100, the control unit 300 controls the fire-extinguishing chemical 201 of the fire-extinguishing chemical tank 200 to be injected into the battery pack 10. In other words, if a fire occurs at the battery pack 10 or the probability of a fire is present, the fire detection sensor 100 detects the fire or the fire risk and notifies it to the control unit 300. Then, the control unit 300 injects the fire-extinguishing chemical 201 contained in the fire-extinguishing chemical tank 200 into the battery pack 10.

If the battery pack 10 has a battery management system (BMS), the control unit 300 may be implemented by means of the BMS. Here, the BMS means a battery management system which is connected to the battery cell 11 and controls overall charging/discharging operations of the battery pack 10. However, the present disclosure is not limited to the above implementation of the control unit 300, and the control unit 300 may also be configured separately from the BMS.

Preferably, as shown in FIG. 1, the fire-extinguishing chemical tank 200 may include an outlet 210, a piston 220 and an explosive 230.

Here, the outlet 210 of the fire-extinguishing chemical tank 200 is connected to the inside of the battery pack 10 to give a path along which the fire-extinguishing chemical 201 in the fire-extinguishing chemical tank 200 is injected into the battery pack 10.

The piston 220 is movably provided in the fire-extinguishing chemical tank 200, and if the piston 220 moves, the fire-extinguishing chemical 201 in the fire-extinguishing chemical tank 200 discharges through the outlet 210 and is injected into the battery pack 10.

In addition, the explosive 230 gives a driving force for allowing the piston 220 to move. In other words, when the explosive 230 explodes, the explosive force allows the piston 220 to move. For this, the explosive 230 is located at a position from which an explosive force may be transferred to the piston 220.

Meanwhile, in this embodiment, the explosion of the explosive 230 may be controlled by the control unit 300. In other words, when fire occurrence is detected, the control unit 300 explodes the explosive 230 of the fire-extinguishing chemical tank 200 to move the piston 220, thereby injecting the fire-extinguishing chemical 201 of the fire-extinguishing chemical tank 200 into the battery pack 10. The configuration for injecting the fire-extinguishing chemical 201 into the battery pack 10 according to this embodiment will be described in more detail with reference to FIG. 2.

Figure 2:
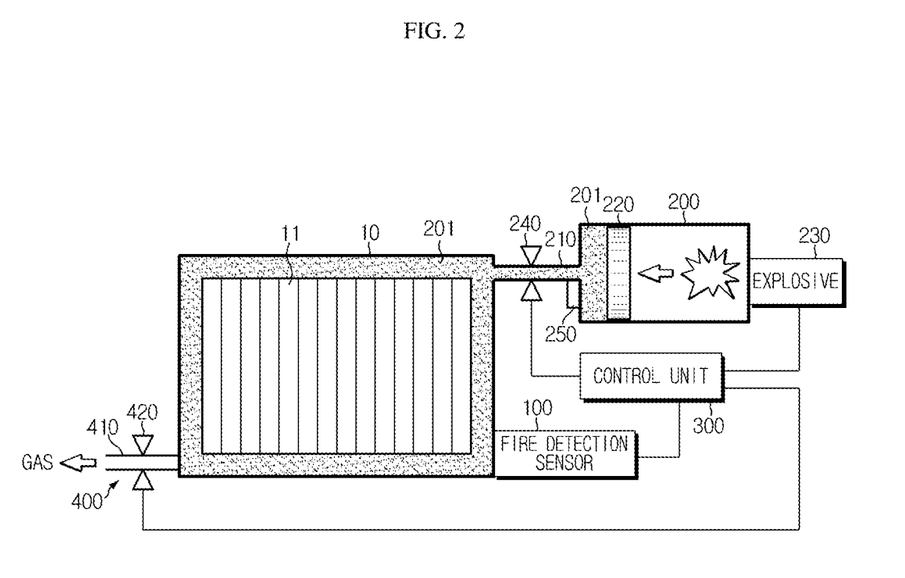
FIG. 2 is a schematic diagram showing a configuration for injecting a fire-extinguishing chemical into a battery pack, in the fire suppression apparatus of FIG. 1.

FIG. 2 is a schematic diagram showing a configuration for injecting the fire-extinguishing chemical 201 into the battery pack 10, in the fire suppression apparatus of FIG. 1.

Referring to FIG. 2, if a fire occurs at the battery pack 10, the fire detection sensor 100 detects the fire, and the fire detection sensor 100 transmits a first detection signal to the control unit 300. In addition, the control unit 300 receiving the signal controls the explosive 230 of the fire-extinguishing chemical tank 200 to explode. If so, the explosive 230 explodes, and an explosive force generated by the explosion allows the piston 220 to move. The movement of the piston 220 allows the fire-extinguishing chemical 201 in the fire-extinguishing chemical tank 200 to discharge through the outlet 210 and be injected into the battery pack 10. Therefore, the fire occurring at the battery pack 10 may be suppressed by the fire-extinguishing chemical 201 injected into the battery pack 10.

In particular, in this embodiment, since the fire-extinguishing chemical 201 is injected into the battery pack 10 due to the movement of the piston 220 caused by the explosion of the explosive 230, the fire-extinguishing chemical 201 is injected very fast. Therefore, even though a fire occurs at the battery pack 10, the fire may be rapidly suppressed at an early stage, thereby preventing the fire from spreading and causing property damage and any casualties.

Preferably, as shown in FIGS. 1 and 2, the fire-extinguishing chemical tank 200 may further include a first outlet valve 240. Here, the first outlet valve 240 is provided at the outlet 210 of the fire-extinguishing chemical tank 200 to play a role of opening or closing the outlet 210. In other words, ordinarily, the first outlet valve 240 is closed as shown in FIG. 1 so that the fire-extinguishing chemical 201 of the fire-extinguishing chemical tank 200 does not discharge through the outlet 210. However, if a fire occurs at the battery pack 10, the first outlet valve 240 is opened as shown in FIG. 2 to give a path along which the fire-extinguishing chemical 201 of the fire-extinguishing chemical tank 200 is injected into the battery pack 10 through the outlet 210.

The first outlet valve 240 may be opened under the control of the control unit 300. For example, if receiving the first detection signal from the fire detection sensor 100, the control unit 300 may control the first outlet valve 240 to be opened. Subsequently or simultaneously, the control unit 300 may control the explosive 230 to explode so that the piston 220 moves and the fire-extinguishing chemical 201 is injected into the battery pack 10.

In other case, the first outlet valve 240 may be automatically opened if the pressure in the fire-extinguishing chemical tank 200 is over a predetermined level. In other words, the first outlet valve 240 is not opened according to the control of the control unit 300 or other components but may be configured to be opened when the pressure in the fire-extinguishing chemical tank 200 increases over a predetermined level. In this embodiment, ordinarily, the first outlet valve 240 is closed. However, if a fire occurs at the battery pack 10 and the explosive 230 explodes by the control unit 300, the piston 220 moves to increase the pressure of the fire-extinguishing chemical tank 200. If so, due to the increase of pressure in the fire-extinguishing chemical tank 200, the first outlet valve 240 is automatically opened, thereby forming a path along which the fire-extinguishing chemical 201 may be injected into the battery pack 10.

Meanwhile, the first outlet valve 240 may be a check valve. If the first outlet valve 240 is implemented with a check valve, the fire-extinguishing chemical 201 may move through the outlet 210 only in a direction from the fire-extinguishing chemical tank 200 to the battery pack 10, and it is possible to prevent the fire-extinguishing chemical 201 from flowing back toward the fire-extinguishing chemical tank 200 in the battery pack 10. However, the present disclosure is not limited to such a kind of the first outlet valve 240, and the first outlet valve 240 may be implemented with various kinds of valves.

Also preferably, the fire-extinguishing chemical tank 200 may further include a cap 250 at the outlet 210. Ordinarily, the cap 250 closes the outlet 210 as shown in FIG. 1 so that the fire-extinguishing chemical 201 in the fire-extinguishing chemical tank 200 does not discharge through the outlet 210. However, if the pressure in the fire-extinguishing chemical tank 200 increases over a predetermined level clue to the explosion of the explosive 230, the cap 250 opens the outlet 210 as shown in FIG. 2. At this time, the outlet 210 may be opened by breaking the cap 250 or separating the cap 250 from the outlet 210.

Figure 3:
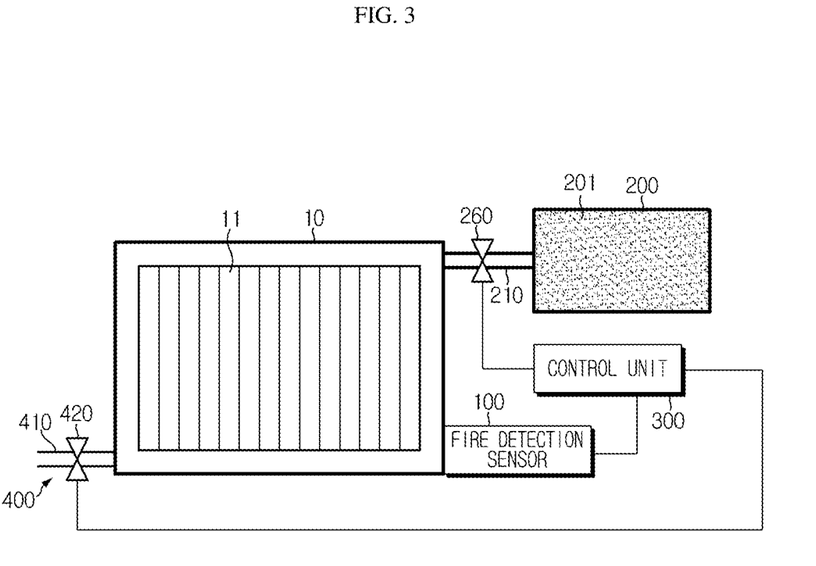
FIG. 3 is a schematic diagram showing a fire suppression apparatus for a battery pack according to another embodiment of the present disclosure.

FIG. 3 is a schematic diagram showing a fire suppression apparatus for a battery pack according to another embodiment of the present disclosure.

Referring to FIG. 3, the fire suppression apparatus for a battery pack includes a fire detection sensor 100, a fire-extinguishing chemical tank 200 and a control unit 300, similar to FIG. 1. Hereinafter, a component identical or similar to that of the former embodiment depicted in FIGS. 1 and 2 will not be described in detail, but the following description will focus on different components from the former embodiment.

As shown in FIG. 3, the fire-extinguishing chemical tank 200 may include an outlet 210 connected to the inside of the battery pack 10 to discharge a fire-extinguishing chemical 201 and a second outlet valve 260 for opening or closing the outlet 210. At this time, the fire-extinguishing chemical tank 200 may possess the fire-extinguishing chemical 201 in its inner space in a highly compressed state. In other words, the fire-extinguishing chemical tank 200 is a high-pressure tank and possesses the fire-extinguishing chemical 201 with a high internal pressure. At this time, if the second outlet valve 260 is opened, the fire-extinguishing chemical 201 may automatically discharge due to the high temperature in the fire-extinguishing chemical tank 200. Therefore, the fire-extinguishing chemical tank 200 may possess the fire-extinguishing chemical 201 with a pressure which allows the fire-extinguishing chemical 201 to discharge through the outlet 210 when the second outlet valve 260 is opened.

In this embodiment, if fire occurrence is detected, the control unit 300 may control the second outlet valve 260 to be opened. If so, the fire-extinguishing chemical 201 may automatically discharge due to the high pressure in the fire-extinguishing chemical tank 200 and be injected into the battery pack 10, thereby suppressing the fire at the battery pack 10.

Here, the second outlet valve 260 may be a solenoid valve, but the present disclosure is not limited to a specific kind of the second outlet valve 260.

Figure 4:
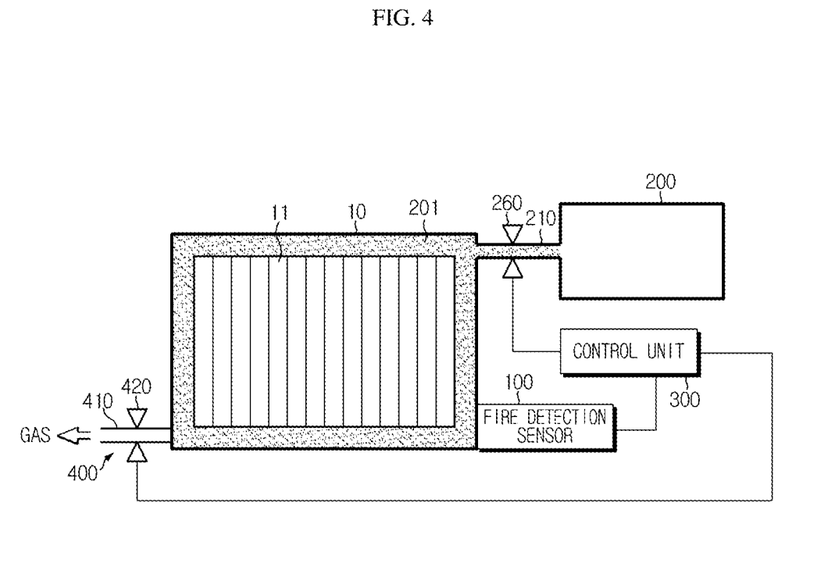
FIG. 4 is a schematic diagram showing a configuration for injecting a fire-extinguishing chemical into a battery pack, in the fire suppression apparatus of FIG. 3.

FIG. 4 is a schematic diagram showing a configuration for injecting the fire-extinguishing chemical 201 into the battery pack 10, in the fire suppression apparatus of FIG. 3.

Referring to FIG. 4, if a fire occurs at the battery pack 10, the fire detection sensor 100 detects the fire, and the fire detection sensor 100 transmits a first detection signal to the control unit 300. In addition, if receiving the first detection signal, the control unit 300 instantly controls the second outlet valve 260 of the fire-extinguishing chemical tank 200 to be opened. If so, the fire-extinguishing chemical 201 may discharge through the outlet 210 due to the high pressure in the fire-extinguishing chemical tank 200 and be injected into the battery pack 10.

Preferably, the fire suppression apparatus for a battery pack according to the present disclosure may further include a gas discharge unit 400 as shown in FIGS. 1 to 4.

The gas discharge unit 400 is provided to at least a part of the battery pack 10 to play a role of allowing an internal gas of the battery pack 10 to discharge out. At this time, the gas discharge unit 400 may include a gas discharge hole 410 formed from the inside of the battery pack 10 to the outside and a gas valve 420 for opening or closing the gas discharge hole 410. Here, the internal gas of the battery pack 10 may be a gas generated by the fire at the battery pack 10 or a gas generated during a charging/discharging process of the battery pack 10.

If the inner space of the battery pack 10 is greatly filled with gas, the fire-extinguishing chemical 201 may not be easily injected into the battery pack 10 due to the gas. However, in this embodiment, since the internal gas of the battery pack 10 discharges out by means of the gas discharge unit 400 when a fire occurs at the battery pack 10, the fire-extinguishing chemical 201 for suppressing the fire may be easily injected into the battery pack 10. Moreover, if the inside of the battery pack 10 is fully filled with gas, the battery pack 10 may explode due to the pressure of the gas. However, in this embodiment, since the internal gas rapidly discharges out, it is possible to prevent the battery pack 10 from exploding.

The battery pack 10 according to the present disclosure includes the fire suppression apparatus as described above. In other words, the battery pack 10 may include the fire suppression apparatus as described above at the inside or outside of the battery pack 10 together with at least one battery cell 11, a battery management system such as BMS and various battery pack protection devices.

In particular, the fire suppression apparatus for a battery pack according to the present disclosure may be provided to a vehicle. A vehicle driven by using a battery, such as an electric vehicle (EV) or a hybrid electric vehicle (HEV), may easily cause fire due to high voltage of the battery pack, traffic accident, or exposure to various temperatures, which may damage not only the vehicle but also cause risk to people in the vehicle. However, if the fire suppression apparatus for a battery pack according to the present disclosure is mounted, even though a fire occurs at the battery pack, the fire may be rapidly suppressed, thereby preventing such damages from occurring or spreading.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, even though the term "unit" has been used in the specification, the term "unit" just represents a logic component and is not limited to a physically distinguishable component, as apparent to those skilled in the art.

What is claimed is:

1. A fire suppression apparatus for a battery pack, comprising:
    a fire detection sensor for detecting a probability of fire occurrence in a battery pack;
    a fire-extinguishing chemical tank containing a fire-extinguishing chemical, wherein the fire-extinguishing chemical tank includes an outlet connected to the inside of the battery pack to discharge the fire-extinguishing chemical, a piston to discharge the fire-extinguishing chemical through the outlet by means of movement, and an explosive to move the piston by explosion;
    a first outlet valve to open or close the outlet of the fire-extinguishing chemical tank; and
    a control unit programmed to allow the fire-extinguishing chemical of the fire-extinguishing chemical tank into the battery pack when fire occurrence is detected by the fire detection sensor,
    wherein when fire occurrence is detected, the first outlet valve is opened under the control of the control unit, and the control unit subsequently explodes the explosive of the fire-extinguishing chemical tank to move the piston so that the fire-extinguishing chemical is injected into the battery pack.

2. The fire suppression apparatus for a battery pack according to claim 1,
    wherein the first outlet valve is a check valve.

3. The fire suppression apparatus for a battery pack according to claim 1,
    wherein the fire-extinguishing chemical tank further includes a cap provided at the outlet to close the outlet, the cap opening the outlet when the pressure in the fire-extinguishing chemical tank is over a predetermined level.

4. The fire suppression apparatus for a battery pack according to claim 1,
    wherein the fire detection sensor includes at least one of a temperature sensor, an impact sensor and a pressure sensor.

5. The fire suppression apparatus for a battery pack according to claim 1, further comprising a gas discharge unit provided to at least a part of the battery pack to discharge an internal gas of the battery pack.

6. The fire suppression apparatus for a battery pack according to claim 5,
wherein the gas discharge unit includes a gas discharge hole formed from the inside of the battery pack to the outside and a gas valve for opening or closing the gas discharge hole.

7. The fire suppression apparatus for a battery pack according to claim 1, wherein the fire-extinguishing chemical is injected into the battery pack in a liquid or gas state.

8. The fire suppression apparatus for a battery pack according to claim 1,
wherein the control unit is implemented by a battery management system (BMS) of the battery pack.

9. A battery pack, which includes the fire suppression apparatus defined in the claim 1.

10. A vehicle, which includes the fire suppression apparatus defined in the claim 1.

11. A method for detecting and suppressing fire in a battery pack, comprising:
   detecting a fire in a battery pack;
   opening a first outlet valve of an outlet of a fire-extinguishing chemical tank, wherein the outlet connects to the inside of the battery pack and wherein the fire-extinguishing chemical tank contains a fire-extinguishing chemical;
   subsequent to opening the first outlet valve, exploding an explosive contained within the fire-extinguishing chemical tank to move a piston contained within the fire-extinguishing chemical tank; and
   injecting the fire-extinguishing chemical through the outlet and into the battery pack by the movement of the piston.

12. The method of claim 11, wherein detecting the fire further comprises:
   detecting at least one of temperature, pressure, or impact to determine an occurrence of the fire in the battery pack.

13. The method of claim 11, wherein the fire-extinguishing chemical is injected into the battery pack in a liquid or gas state.

14. The method of claim 11, further comprising:
   discharging an internal gas of the battery pack.

15. The method of claim 14, wherein the internal gas is generated by the fire in the battery pack.

* * * * *